US012590988B1

(12) United States Patent　　(10) Patent No.:　US 12,590,988 B1

Hu et al.　　　　　　　　　　　(45) Date of Patent:　Mar. 31, 2026

(54) REFERENCE SAMPLE SUITABLE TO CALIBRATE MAGNETIC MICROSCOPE'S PROBE TIP AND CALIBRATION METHOD

(71) Applicant: CHINA JILIANG UNIVERSITY, Hangzhou (CN)

(72) Inventors: Xiukun Hu, Hangzhou (CN); Shuai Yang, Hangzhou (CN); Qiong Wu, Hangzhou (CN); Hangfu Yang, Hangzhou (CN); Jiage Jia, Hangzhou (CN)

(73) Assignee: CHINA JILIANG UNIVERSITY, Hangzhou (CN)

( * ) Notice: Subject to any disclaimer, the term of this patent is extended or adjusted under 35 U.S.C. 154(b) by 0 days.

(21) Appl. No.: 19/272,897

(22) Filed: Jul. 17, 2025

(51) Int. Cl.
　　*G01Q 40/02*　　　(2010.01)
(52) U.S. Cl.
　　CPC .................................... *G01Q 40/02* (2013.01)
(58) Field of Classification Search
　　USPC ......................................................... 850/20
　　See application file for complete search history.

(56) References Cited

U.S. PATENT DOCUMENTS

| | | | |
|---|---|---|---|
| 6,862,921 B2 * | 3/2005 | Chand ................... | G01Q 10/06 |
| | | | 850/26 |
| 2002/0084410 A1 * | 7/2002 | Colbert ................. | C01B 32/174 |
| 2015/0185249 A1 * | 7/2015 | Hantschel .............. | G01Q 70/16 |
| | | | 850/59 |

OTHER PUBLICATIONS

Xiukun Hu , "Journal of Magnetism and Magnetic Materials" 511 (2020) 166947.

* cited by examiner

*Primary Examiner* — Kiet T Nguyen
(74) *Attorney, Agent, or Firm* — Birchwood IP

(57)　　　　ABSTRACT

The present invention discloses a reference sample suitable to calibrate a magnetic microscope's probe tip and a calibration method. The reference sample is a magnetic micro-nanostructure made of a magnetic material and formed on the surface of a substrate material, has at least one group of magnetic micro-nano structures composed of a plurality of substructures, and can generate a magnetic field with a specific spatial distribution on the surface of the sample. The reference sample is used to calibrate a magnetic microscope's probe tip. The magnetic material is configured to provide magnetic micro-nano structures that contain a variety of spatial feature size patterns, which can generate a stable magnetic field with specific spatial distribution on the sample surface. The present invention can broaden the spatial frequency range for calibrating the magnetic probe and realize the quantitative measurement to magnetic fields on the surface of different magnetic micro-nano structures.

10 Claims, 7 Drawing Sheets

Arranging the reference sample on a test support of a magnetic force microscope to be calibrated, so as to introduce at least one group of substructures selected for the reference sample into a test range of a magnetic probe Obtaining magnetic phase image data of the at least one group of substructures at a specified probe-sample distance, which is preferred to be within 30 nm-100 nm Evaluating image data obtained above and storing an evaluation result as a first evaluation result Introducing other one group of substructures selected for the reference sample into a test range of a magnetic probe, then repeating steps (2)-(3) and storing an evaluation result as a subsequent evaluation result Performing data fusion on all the evaluation results to obtain a transfer function of the magnetic probe tip covering a wide space frequency domain, then fulfilling calibration to the magnetic probe tip Arranging the reference sample on a test support of a magnetic force microscope to be calibrated, so as to introduce at least one group of substructures selected for the reference sample into a test range of a magnetic probe Aiding a test system of the magnetic force microscope, obtaining magnetic phase image data of the at least one group of substructures at a specified probe-sample distance Evaluating image data obtained above and storing an evaluation result in a retrievable manner, so as to obtain a transfer function of a magnetic probe tip within a specific frequency range

FIG. 7

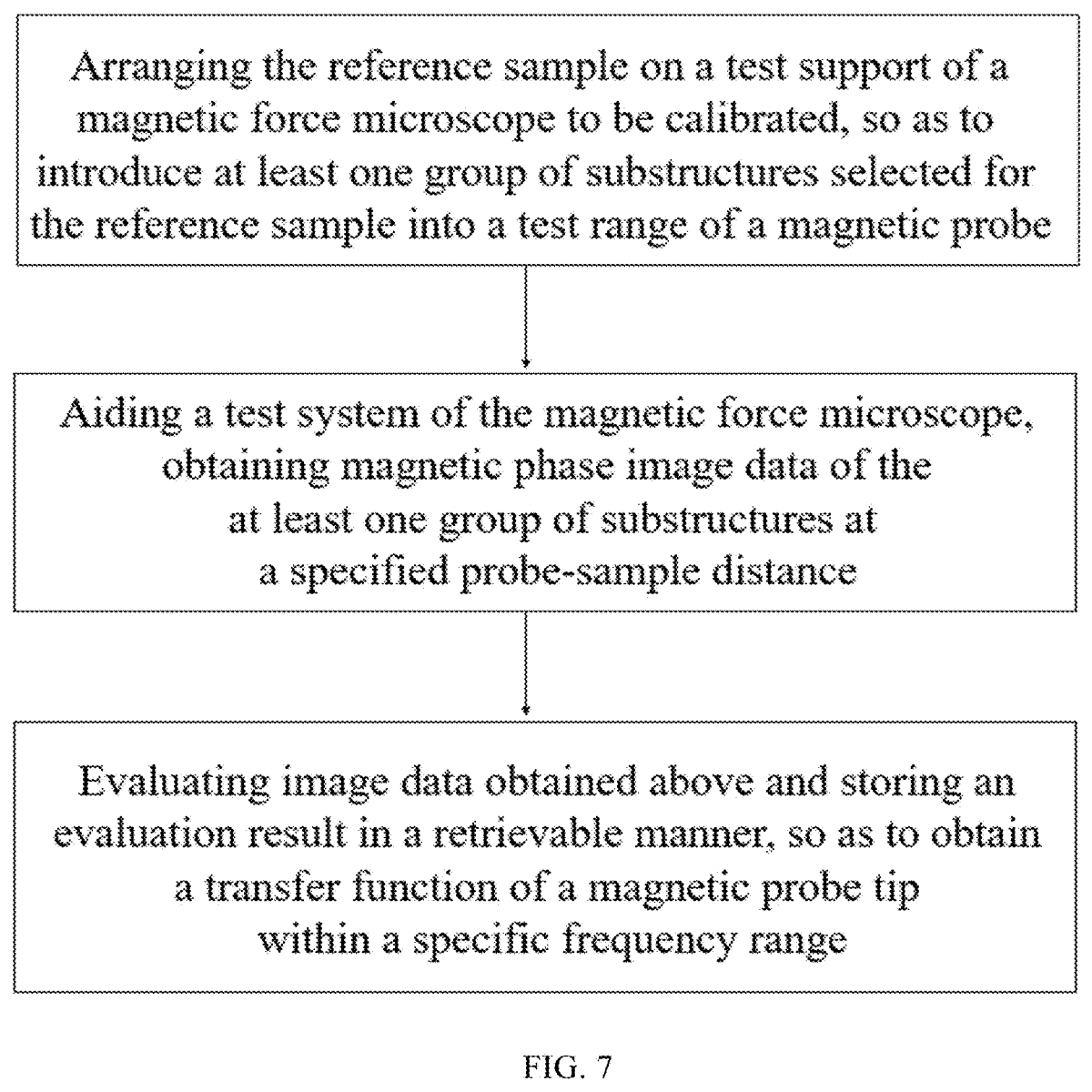

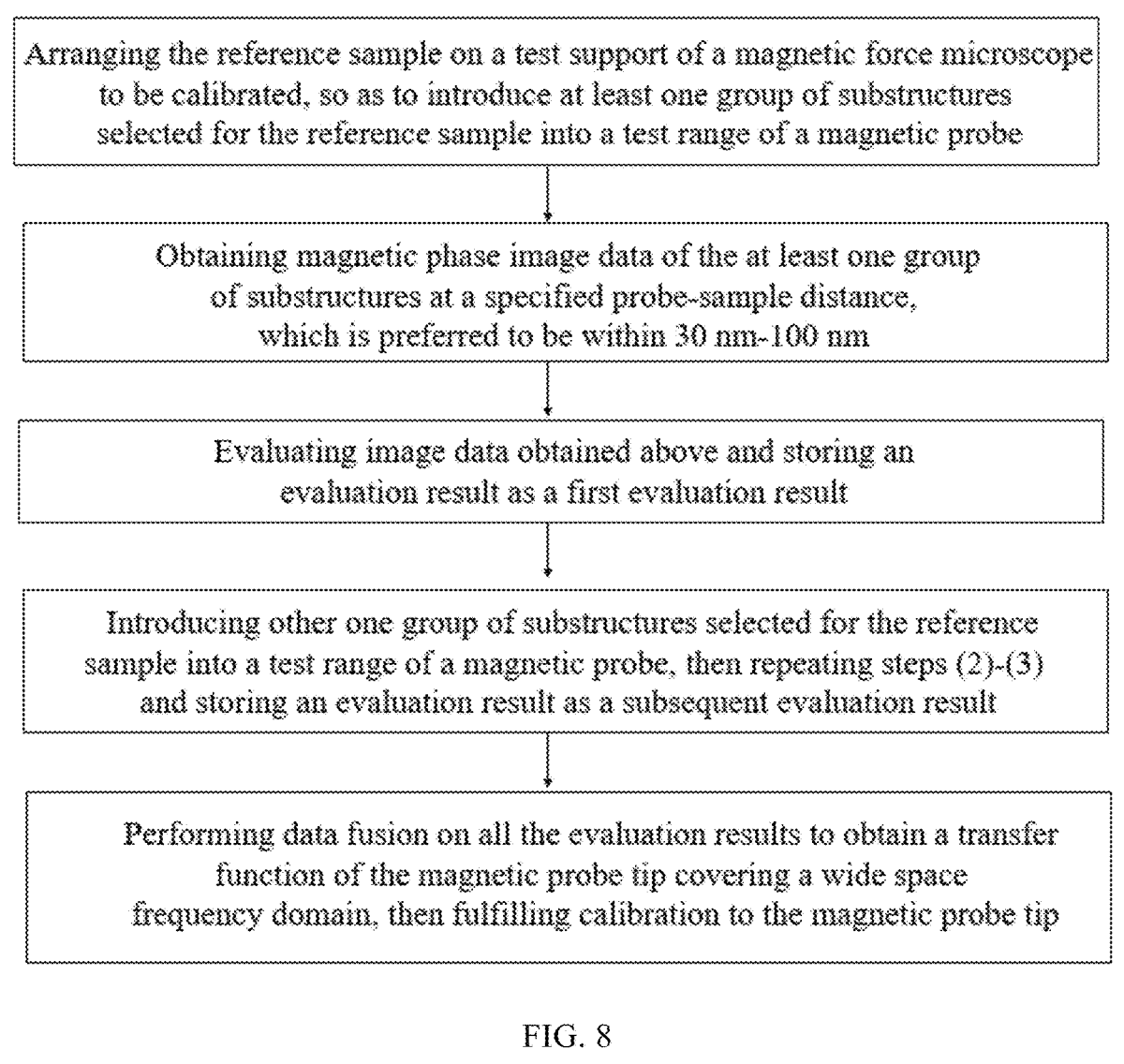

Arranging the reference sample on a test support of a magnetic force microscope to be calibrated, so as to introduce at least one group of substructures selected for the reference sample into a test range of a magnetic probe Obtaining magnetic phase image data of the at least one group of substructures at a specified probe-sample distance, which is preferred to be within 30 nm-100 nm Evaluating image data obtained above and storing an evaluation result as a first evaluation result Introducing other one group of substructures selected for the reference sample into a test range of a magnetic probe, then repeating steps (2)-(3) and storing an evaluation result as a subsequent evaluation result Performing data fusion on all the evaluation results to obtain a transfer function of the magnetic probe tip covering a wide space frequency domain, then fulfilling calibration to the magnetic probe tip

FIG. 8

REFERENCE SAMPLE SUITABLE TO CALIBRATE MAGNETIC MICROSCOPE'S PROBE TIP AND CALIBRATION METHOD

TECHNICAL FIELD

The present invention relates to the technical field of testing micro-nano magnetic fields, in particular to a reference sample suitable to calibrate a magnetic microscope's probe tip and a calibration method.

BACKGROUND

As an important branch of scanning force microscopy, a MFM's test system is mainly made from a cantilever, a piezoelectric positioner and a means for detecting optical cantilever's motion. When a tip coated with a magnetic film scans a magnetic sample, a magnetostatic interaction force between the magnetic tip and the sample surface's magnetic field will change the cantilever's vibration frequency and amplitude; therefore, by comparing detection signals therefrom, it is possible to characterize the magnetic properties of the material surface. However, a MFM measurement result is usually used only to provide a purely qualitative image for a stray magnetic field, rather than to quantitatively analyze data. The reason for that consist in that a measurement signal is highly dependent on magnetism of a magnetic tip, mechanical properties of a cantilever and sensitivity of a detection device, and it is only by understanding the shape and magnetization state of the magnetic tip and applying a deconvolution algorithm that an accurate quantitative magnetic field map can be extracted from a MFM image. Therefore, accurately calibrating a magnetic tip determines the reliability of the MFM to quantitatively analyze a magnetic field.

A transfer function method for magnetic probe tips is typically calibrated by a vertically magnetizing a reference sample, so a magnetic field space frequency domain of the reference sample determines a space frequency domain of the magnetic probe tip that can be calibrated. For the reference samples to calibrate the tip that do not cover a full frequency domain, it is not possible to obtain a reliable spatial magnetic field distribution of the magnetic probe tip. Regarding calibration of MFM measurement, people have tested several different types of nanomagnetic standard materials (for example, X. K. Hu et al., Round robin comparison on quantitative nanometer scale magnetic field measurements by magnetic force microscopy, Journal of Magnetism and Magnetic Materials; 511/2020: 166947. 2020); however, this periodic magnetic domain structure based on intrinsic magnetic properties determines the singleness of the space frequency domain for calibrating the magnetic probe tip, and quantitative measurement to a magnetic field of a sample to be measured is also restricted within a range of a calibrated frequency domain, failing to cover a sufficient span of a feature size whining a range from micrometer to nanometer. Such a span is an overlapping measurement range required for calibrating devices and techniques such as high-resolution magnetic force microscopes and micron-resolution microscopy (a magneto-optical indicator film microscope), acting as an indispensable and important step for establishing a complete traceability chain of quantitative magnetic fields from nanometers to micrometers and even millimeters. Therefore, a reference sample with magnetic patterns varying in sizes covering a range from a few microns to tens of nanometers is an effective way to broaden the space frequency domain for calibrating a magnetic probe tip. A patterned magnetic multilayer film with high vertical anisotropy is preferred to solve this problem.

SUMMARY

In order to solve the above problem, the present invention proposes a reference sample suitable to calibrate a magnetic microscope's probe tip and a calibration method, so as to solve the problem that the reference sample for calibrating a probe has a single-sized space frequency domain and a surface magnetic field of a micro and nano-sized material cannot be effectively calibrated.

The present invention is embodied by the following technical solutions: a reference sample suitable to calibrate a magnetic microscope's probe tip includes a substrate material and a magnetic micro-nanostructure made from a magnetic material and predetermined in size and shape.

The magnetic material has the properties of vertical magnetic anisotropy, a preferred magnetization direction is perpendicular to a substrate plane, and main part of the magnetic material includes but is not limited to a Co-based and CoFeB-based monolayer and/or multilayer film, which has clear saturation magnetization and is patterned into a magnetic micro-nano structure. The upper surface of the film and the substrate plane are preferred to have quite small surface roughness, and the surface roughness of a preferrable film is about 1 nm, and in order to avoid interfering with measurement of a nano-sized magnetic probe tip, the heights of the particles on the surface of the film are preferably lower than 30 nm. The upper surface of the magnetic micro-nanostructure is parallel to the substrate plane, and the distance from the substrate plane in a z-direction is less than or equal to 100 nm, preferably less than or equal to 50 nm.

The magnetic micro-nanostructure contains at least one group of substructures, and the widths of the substructures vary from 100 nm to 10 nm, the substructures are separated from one another by a certain distance, and the starting and ending spatial frequencies corresponding to the substructures vary from $1/200$ nm$-1$ to $1/20$ $\mu$m$-1$.

According to one embodiment of the present invention, the magnetic micro-nanostructure contains at least one group of structures, the substructure of each group of the structures is a line-shaped structure, each line-shaped structure has a different width, corresponding to which the spatial frequency varies continuously and linearly with distance. Each edge position of the line-shaped structures changes gradually with the linear relation, and the edge positions of the line-shaped structures correspond to a zero-crossing point of a chirp curve in turn. The frequency of the chirp curve is part of $1/200$ nm$-1$~$1/20$ m$-1$, and the frequency range covers $1/200$ nm$-1$~$1/20$ m$-1$ when the magnetic micro-nanostructure contains only one group of substructures, and the frequency ranges of each group of substructures are partially overlapped when the magnetic micro-nanostructure contains more than one group of substructures.

According to one embodiment of the present invention, the magnetic micro-nanostructure contains at least one group of structures, the substructure of each group of the structures is a circle-shaped structure, each circle-shaped structure has a different width, corresponding to which the radial spatial frequency varies continuously and linearly with radii of the circles. Each edge position of the circle-shaped structures changes gradually with the linear relation, and the edge positions of the circle-shaped structures correspond to a zero-crossing point of a chirp curve in turn. The frequency of the chirp curve is part of $\frac{1}{200}$ nm$-1$~$\frac{1}{20}$ m$-1$, and the frequency range covers $\frac{1}{200}$ nm$-1$~$\frac{1}{20}$ m$-1$ when the magnetic micro-nanostructure contains only one group of substructures, and the frequency ranges of each group of substructures are partially overlapped when the magnetic micro-nanostructure contains more than one group of substructures.

According to one embodiment of the present invention, the magnetic micro-nanostructure contains at least one group of structures, the substructure of each group of the structures is a fan-shaped structure arranged periodically along a circumferential direction, and each fan-shaped structure has a fixed central angle, and a central angle of the area between edges of adjacent fan-shaped structures is the same as a central angle of each fan-shaped structure. Each circumference contains fan-shaped periodic structures in integer number, and each substructure is a fan-shaped structure the radial spatial frequency of which changes continuously and linearly with radii. The frequency range at the minimum and maximum radii of the circles covers $\frac{1}{200}$ nm$-1$~$\frac{1}{20}$ m$-1$ when the magnetic micro-nanostructure contains only one group of substructures, and the frequency ranges of each group of substructures are partially overlapped when the magnetic micro-nanostructure contains more than one group of substructures.

A use of a reference sample for calibrating a magnetic microscope's probe tip with specific spatial frequency properties includes the steps of:

(1) arranging a reference sample on a test support of a magnetic force microscope to be calibrated, so as to introduce at least one group of substructures of the structure selected for the reference sample into a test range of a magnetic probe;

(2) with the aid of a test system of the magnetic force microscope, obtaining magnetic phase image data of the at least one group of substructures at a specified probe-sample distance; and (3) evaluating image data obtained above and storing an evaluation result in a retrievable manner, so as to obtain a transfer function of a magnetic probe tip within a specific frequency range.

A calibration method of a magnetic probe tip by constructing a wide space frequency domain includes the steps of (1) arranging a reference sample on a test support of a magnetic force microscope to be calibrated, so as to introduce one group of substructures of the structure selected for the reference sample into a test range of a magnetic probe;

(2) with the aid of a test system of the magnetic force microscope, obtaining magnetic phase image data of the one group of substructures at a specified probe-sample distance, which is preferred to be within 30 nm$-100$ nm;

(3) evaluating image data obtained above and storing an evaluation result as a first evaluation result;

(4) introducing other one group of substructures of the structure selected for the reference sample into a test range of a magnetic probe;

(5) with the aid of a test system of the magnetic force microscope, obtaining magnetic phase image data of the other group of substructures at a probe-sample distance equal to step (2);

(6) evaluating image data obtained above and storing an evaluation result as a second evaluation result;

(7) repeating steps (1)-(3) to evaluate image data obtained above and store all evaluation results that meet requirements of a specific space frequency; and (8) performing data fusion on the stored results to obtain a transfer function of the magnetic probe tip with a wide space frequency domain, then fulfilling calibration to the magnetic probe tip.

Compared with the prior art, the reference sample suitable to calibrate a magnetic microscope's probe tip and the calibration method proposed by the present invention have the following beneficial effects.

The present invention can realize calibration to a component of the spatial magnetic field of the magnetic probe tip in a certain space frequency range by constructing a magnetic micro-nanostructure that can generate a spatial magnetic field with different spatial frequencies, obtain more information about spatial magnetic field distribution of the magnetic probe tip, and broaden the space frequency domain range for calibrating the magnetic probe tip, make quantitative measurement comparable between the magnetic force microscope and other scanning magnetic field measurement systems, such as a scanning Hall sensor and a magneto-optical indicator film microscope, and build a traceability chain for the quantitative measurement to the spatial magnetic field from nanometers to millimeters.

BRIEF DESCRIPTION OF THE DRAWINGS

In order to more clearly illustrate the technical solutions in the embodiments of the present invention or the prior art, we shall briefly describe the figures required for description to the embodiments or the prior art as follows. Obviously, the figures described below are only some embodiments of the present invention, it is possible for a person skilled in the art to obtain other figures on the premise of not doing creative work.

FIG. 7 is a flowchart diagram of a method using the reference sample for calibrating a magnetic microscope's probe tip.

FIG. 8 is a flowchart diagram of a calibration method of a magnetic probe tip by constructing a wide space frequency domain.

1—substrate material; 2—magnetic micro-nanostructure; 2a—one group of structures; 3—upper surface of the reference sample; 4—surface used to support a magnetic micro—nanostructure; 5—the reference sample suitable to calibrate a magnetic microscope's probe tip; 8—magnetic microscope's probe tip; 9—magnetic probe tip.

DESCRIPTION OF EMBODIMENTS

All properties, or all methods or steps in the process disclosed in this description may be combined with each other in any way, except for mutually exclusive properties and/or steps.

Unless otherwise stated, any feature disclosed in this description (including any claims, abstract and drawings) may be replaced by another equivalent or similar substitute feature. That is, unless otherwise stated, each feature is merely an instance in a series of equivalent or similar properties.

Figure 1:
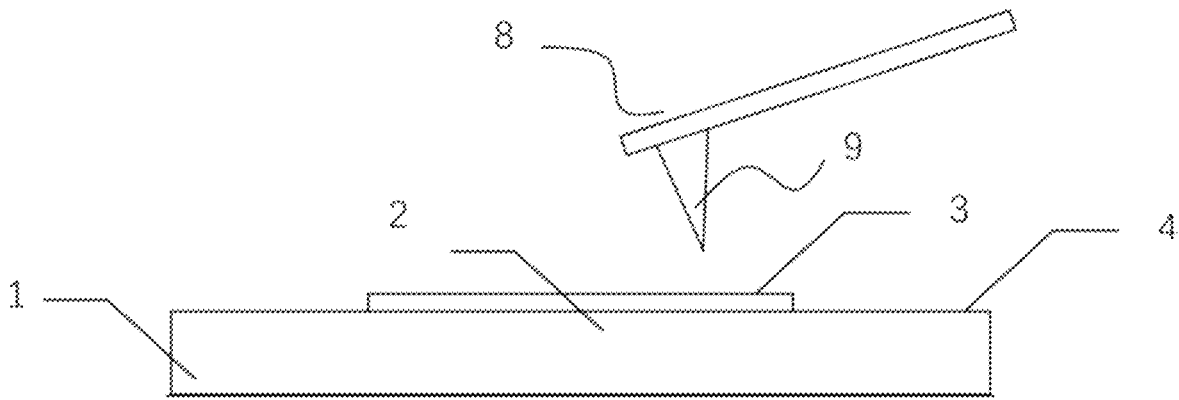
FIG. 1 shows a side view of the reference sample suitable to calibrate a magnetic microscope's probe tip.
Figure 2:
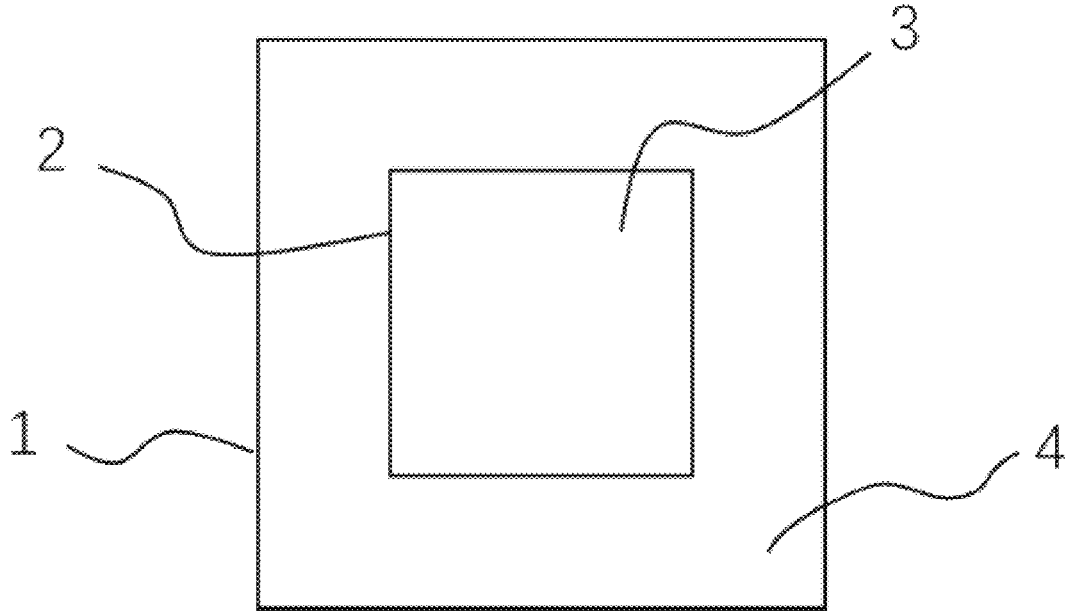
FIG. 2 shows a top view of the reference sample suitable to calibrate a magnetic microscope's probe tip.

FIGS. 1-2 schematically show the reference sample 5 suitable to calibrate a magnetic microscope's probe tip 8 according to the present invention, the reference sample includes a substrate material 1, which has an upper surface 4 that is used to support a magnetic micro-nanostructure 2. The upper surface 3 of the magnetic micro-nanostructure 2 is parallel to the upper surface 4 of the substrate.

The substrate material 1 may be a semiconductor single crystalline material or other materials with a generatable film, including but not limited to silicon (Si or Si/SiOx) substrates, silicon carbide (SiC), sapphire (Al2O3).

The magnetic micro-nanostructure 2 is obtained by patterning a magnetic thin film, which has the properties of vertical magnetic anisotropy with a preferred magnetization direction perpendicular to a substrate plane, and main part of the magnetic film includes but is not limited to a Co-based and CoFeB-based monolayer and/or multilayer film, which has clear saturation magnetization. The upper surface of the film and the substrate plane are preferred to have surface roughness lower to nanometers. The surface of the film is clean; it is not preferred to have no particle-type foreign matter having a height higher than 30 nm. The upper surface of the magnetic micro-nanostructure is parallel to the substrate plane, and the distance from the substrate plane in a z-direction is less than or equal to 100 nm, preferably less than or equal to 50 nm.

Figure 3:
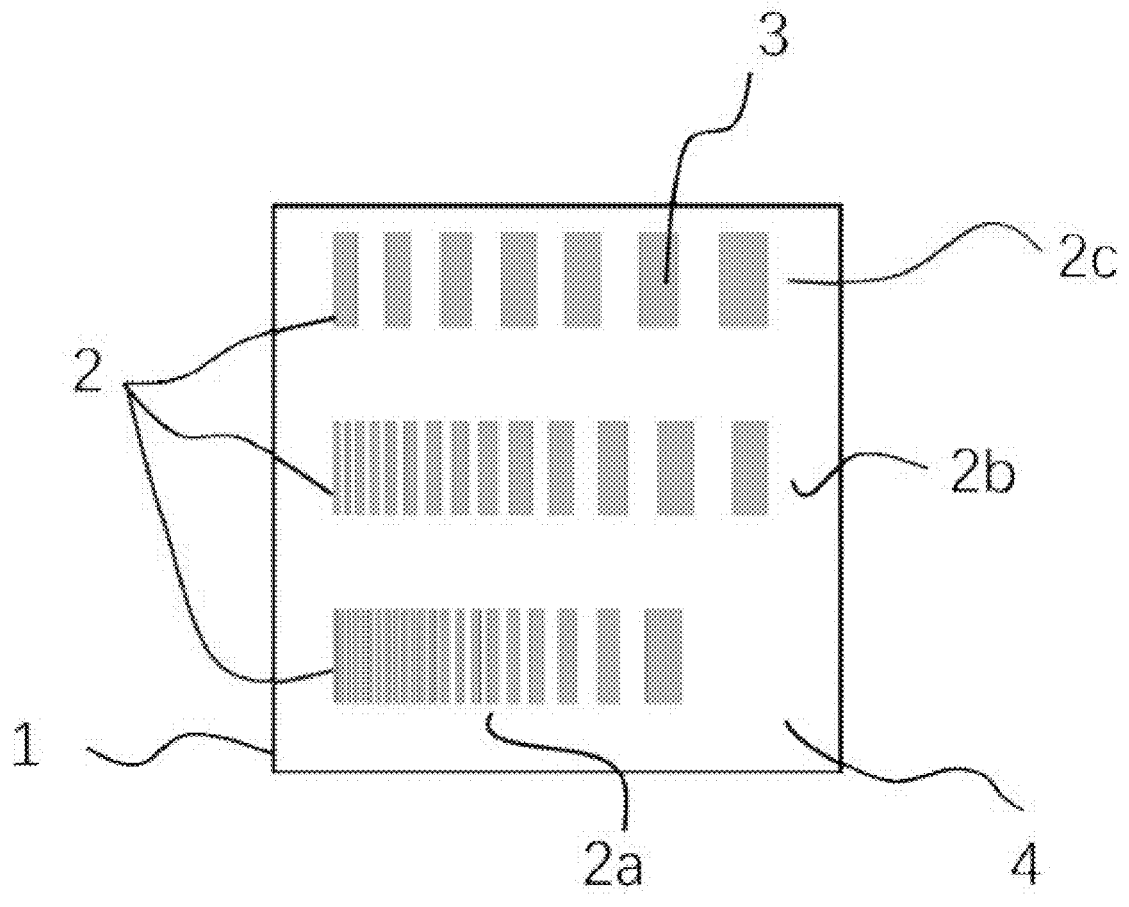
FIG. 3 is a schematic diagram of the reference sample having a substructure that is a line-shaped structure.
Figure 5:
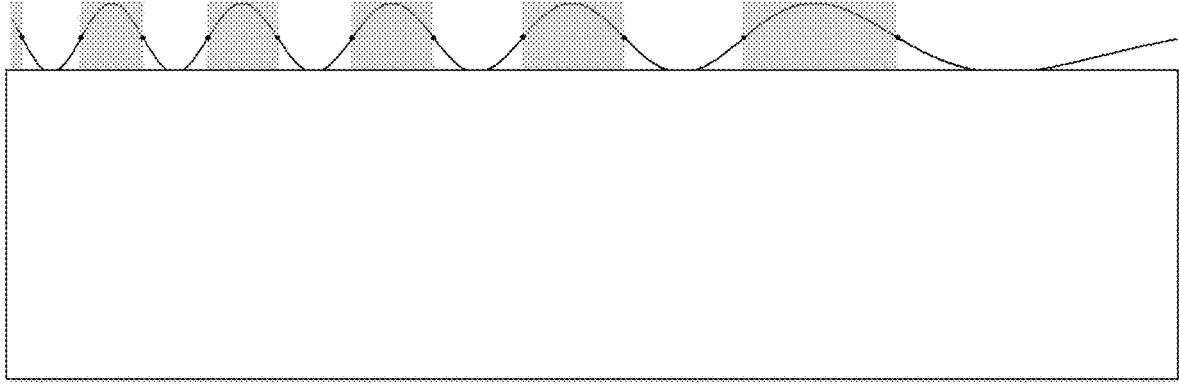
FIG. 5 is a schematic diagram of the edge positions of the substructures are a line-shaped structure and a circle-shaped structure.

FIG. 3 gives an example of the reference sample 5, the magnetic micro-nanostructure of which contains at least one group of structures 2a. Each group of structures 2a consists of line-shaped substructures with different widths, and the width of the substructure varies from 100 nm to 10 μm, and the adjacent substructures are separated from each other by a certain distance. The spatial frequency corresponding to each substructure varies continuously and linearly with distance. Each edge position of the line-shaped structures changes gradually with the linear relation. FIG. 5 illustrates the one-to-one correspondence between the edge positions of the line-shaped structures and the zero-crossing point of the chirp curve. In this example, the starting and ending spatial frequencies corresponding to the substructures vary from 1/200 nm−1 to 1/20 μm−1, and the frequency range covers 1/200 nm−1~1/20 μm−1 when the magnetic micro-nanostructure contains only one group of substructures, and the frequency ranges of each group of substructures are partially overlapped when the magnetic micro-nanostructure contains more than one group of substructures.

Figure 4:
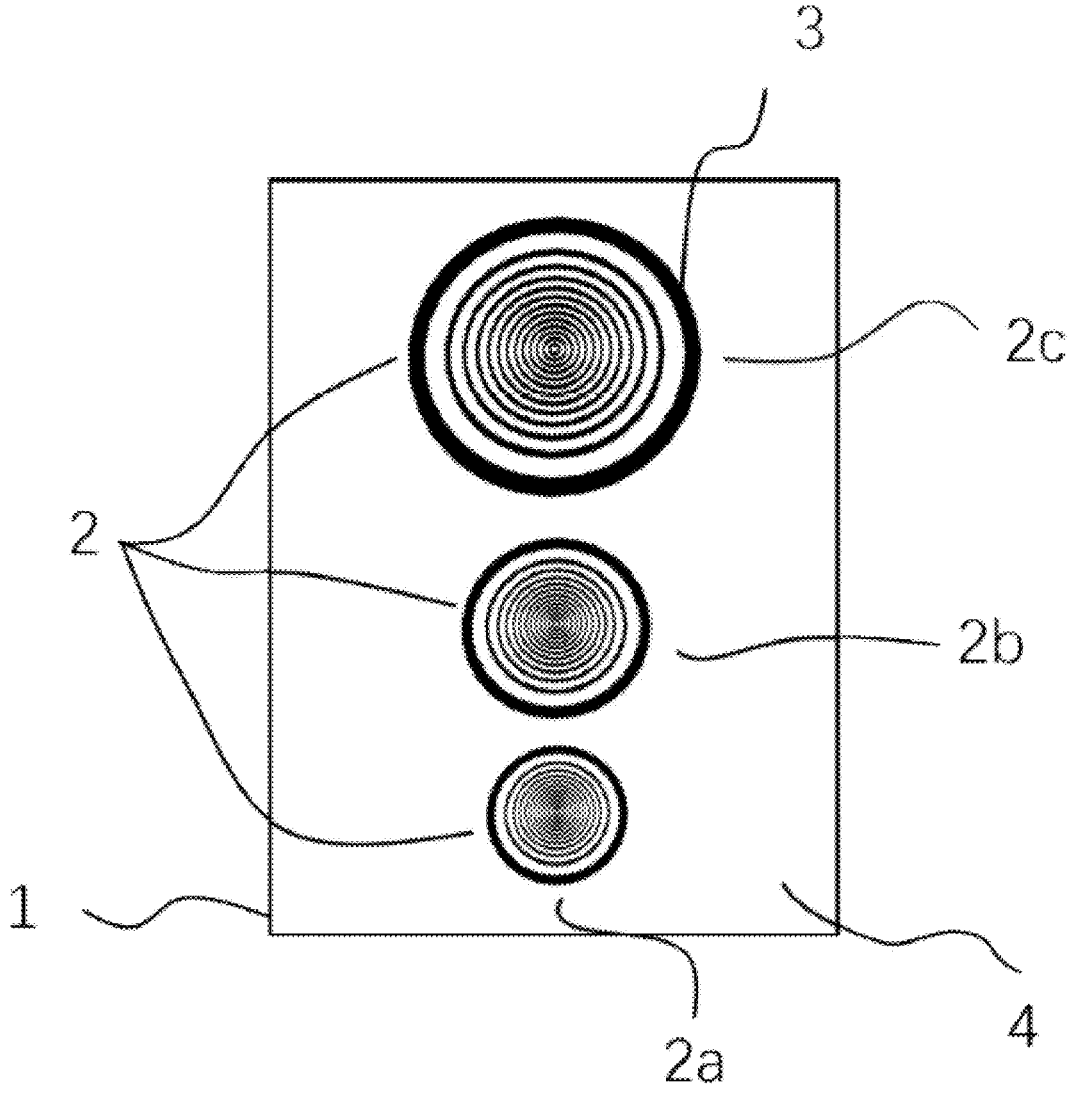
FIG. 4 is a schematic diagram of the reference sample having a substructure that is a circle-shaped structure.

FIG. 4 gives another example of the reference sample 5, the magnetic micro-nanostructure of which contains at least one group of structures 2a. Each group of structures 2a consists of circle-shaped substructures with different widths, and the width of the substructure varies from 100 nm to 10 μm, and the adjacent circle-shaped structures are separated from each other by a certain distance. The spatial frequency corresponding to each substructure varies continuously and linearly with distance. Each edge position of the circle-shaped structures changes gradually with the linear relation. FIG. 5 illustrates the one-to-one correspondence between the edge positions of the circle-shaped structures and the zero-crossing point of the chirp curve. In this example, the starting and ending spatial frequencies corresponding to the circle-shaped structures vary from 1/200 nm−1 to 1/20 μm−1, and the frequency range covers 1/200 nm−1~1/20 μm−1 when the magnetic micro-nanostructure contains only one group of substructures, and the frequency ranges of each group of substructures are partially overlapped when the magnetic micro-nanostructure contains more than one group of substructures.

Figure 6:
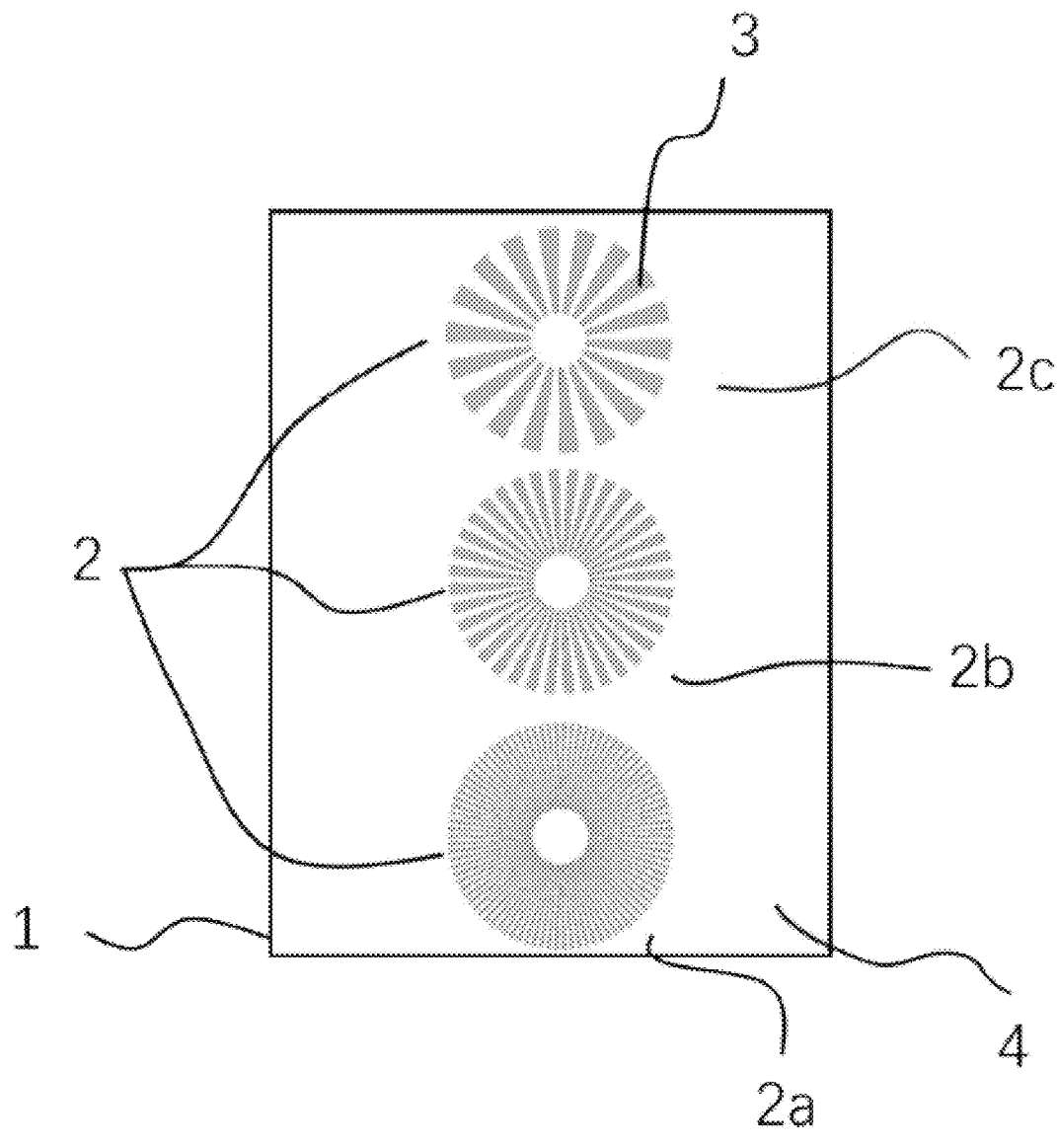
FIG. 6 is a schematic diagram of the reference sample having a substructure that is a fan-shaped structure.

FIG. 6 gives another example of the reference sample 5, the magnetic micro-nanostructure of which contains at least one group of structures 2a. Each group of structures 2a consists of fan-shaped structures with different central angles that are arranged periodically along a circumferential direction, and each fan-shaped structure has a fixed central angle, and a central angle of the area between edges of adjacent fan-shaped structures is the same as a central angle of each fan-shaped structure. Each circumference contains fan-shaped periodic structures in integer number, and each substructure is a fan-shaped structure the radial spatial frequency of which changes continuously and linearly with radii. The frequency range at the minimum and maximum radii of the circles covers 1/200 nm−1~1/20 m−1 when the magnetic micro-nanostructure contains only one group of substructures, and the frequency ranges of each group of substructures are partially overlapped when the magnetic micro-nanostructure contains more than one group of substructures.

A measurement process that the reference sample 5 suitable to calibrate a magnetic microscope's probe tip 8 used to calibrate a magnetic microscope's probe tip 9 is described as follows.

As provided by this example, a use of a reference sample for calibrating a magnetic microscope's probe tip 8 with specific spatial frequency properties includes the steps of (as shown in FIG. 7):

(1) arranging a reference sample 5 on a test support of a magnetic force microscope to be calibrated, so as to introduce at least one group of substructures 2a of the structure selected for the reference sample into a test range of a magnetic probe;

(2) with the aid of a test system of the magnetic force microscope, obtaining magnetic phase image data of the at least one group of substructures 2a at a specified distance on the upper surface 3 between the probe and the reference sample 5; and (3) evaluating image data obtained above and storing an evaluation result in a retrievable manner, so as to obtain a transfer function of a magnetic probe tip 9 within a specific frequency range.

As further provided by this example, a calibration method of a magnetic probe tip 9 by constructing a wide space frequency domain includes the steps of (as shown in FIG. 8)

(1) arranging a reference sample 5 on a test support of a magnetic force microscope to be calibrated, so as to introduce one group of substructures 2a of the structure selected for the reference sample into a test range of a magnetic probe;

(2) with the aid of a test system of the magnetic force microscope, obtaining magnetic phase image data of the one group of substructures 2a at a specified distance on the upper surface 3 between the probe and the reference sample 5, which is preferred to be within 30 nm−100 nm;

(3) evaluating image data obtained above and storing an evaluation result as a first evaluation result;

(4) introducing other one group of substructures 2a of the structure selected for the reference sample into a test range of a magnetic probe;

(5) with the aid of a test system of the magnetic force microscope, obtaining magnetic phase image data of the other group of substructures at a specified distance on the upper surface 3 between the probe and the reference sample 5 equal to step (2);

(6) evaluating image data obtained above and storing an evaluation result as a second evaluation result;

(7) repeating steps (1)-(3) to evaluate image data obtained above and store all evaluation results that meet requirements of a specific space frequency; and (8) performing data fusion on the stored results to obtain a transfer function of the magnetic probe tip 9 with a wide space frequency domain, then fulfilling calibration to the magnetic probe tip 9.

The above is only some embodiments of the present invention, but they don't pose any limitation on the protection scope of the present invention, and any change or replacement called to mind without creative work shall fall within the protection scope of the present invention. Therefore, the protection scope of the present invention should be subject to the protection scope defined in the claims.

What is claimed is:

1. A reference sample suitable to calibrate a magnetic microscope's probe tip, and having a substrate material and a magnetic micro-nanostructure made from a magnetic material capable of producing a magnetic field with a specific spatial distribution on a surface of the reference sample, wherein the substrate material of the reference sample is a semiconductor single crystalline material;

the magnetic material is a magnetic film having properties of vertical magnetic anisotropy;

the magnetic micro-nanostructure is configured to be at least one group of magnetic micro-nano structures, and each group of magnetic micro-nano structures includes at least one group of substructures, the substructures are configured to be a plurality in predetermined size and shape, the substructures are separated by a certain distance from each other, and in a single magnetic domain, a magnetization direction of which is perpendicular to the surface of the reference sample is formed within each of the substructures; widths of the substructures vary from 100 nm to 10 nm, and starting and ending spatial frequencies corresponding to the substructures vary from $\frac{1}{200}$ nm$^{-1}$ to $\frac{1}{20}$ $\mu$m$^{-1}$.

2. The reference sample suitable to calibrate a magnetic microscope's probe tip according to claim 1, wherein an upper surface of the magnetic micro-nanostructure is parallel to a substrate plane, and a distance from the substrate plane in a z-direction is less than or equal to 100 nm.

3. The reference sample suitable to calibrate a magnetic microscope's probe tip according to claim 1, wherein the magnetic micro-nanostructure is configured to be a plurality of groups of the substructures, and each of substructures of at least one group is configured to be a line-shaped structure.

4. The reference sample suitable to calibrate a magnetic microscope's probe tip according to claim 3, wherein the line-shaped structure is a line-shaped structure having the spatial frequency of which varies continuously and linearly with a distance, each edge position of the line-shaped structures changes gradually with a linear relation, and the edge positions of the line-shaped structures correspond to a zero-crossing point of a chirp curve in turn, a frequency of the chirp curve corresponding to each group of line-shaped structures is part of $\frac{1}{200}$ nm$^{-1}$ to $\frac{1}{20}$ $\mu$m$^{-1}$, and the frequency ranges of each group of line-shaped structures are partially overlapped when the magnetic micro-nanostructure contains more than one group of substructures.

5. The reference sample suitable to calibrate a magnetic microscope's probe tip according to claim 1, wherein the magnetic micro-nanostructure is configured to be a plurality of groups of the substructures, and each of substructures of at least one group is configured to be a circle-shaped structure.

6. The reference sample suitable to calibrate a magnetic microscope's probe tip according to claim 5, wherein the circle-shaped structure is a circle-shaped structure having the spatial frequency of which varies continuously and linearly with a distance, each edge position of the circle-shaped structures changes gradually with a linear relation, and the edge positions of the circle-shaped structures correspond to a zero-crossing point of a chirp curve in turn, a frequency of the chirp curve corresponding to each group of circle-shaped structures is part of $\frac{1}{200}$ nm$^{-1}$ to $\frac{1}{20}$ $\mu$m$^{-1}$, and the frequency ranges of each group of circle-shaped structures are partially overlapped when the magnetic micro-nanostructure contains more than one group of substructures.

7. The reference sample suitable to calibrate a magnetic microscope's probe tip according to claim 1, wherein the magnetic micro-nanostructure is configured to be a plurality of groups of the substructures, and each of substructures of at least one group is configured to be a fan-shaped structure arranged periodically along a circumferential direction.

8. The reference sample suitable to calibrate a magnetic microscope's probe tip according to claim 7, wherein each fan-shaped structure has a fixed central angle, a central angle of an area between edges of adjacent fan-shaped structures is the same as a central angle of each fan-shaped structure, each circumference contains fan-shaped periodic structures in integer number, and each substructure is a fan-shaped structure having the radial spatial frequency of which changes continuously and linearly with radii, the frequency range at the minimum and maximum radii corresponding to each group of fan-shaped structures covers 200 nm to 20 $\mu$m, and the frequency ranges of each group of fan-shaped structures are partially overlapped when the magnetic micronanostructure contains more than one group of substructures.

9. A method using of the reference sample for calibrating a magnetic microscope's probe tip with specific spatial frequency properties according to claim 1 comprises the steps of:

(1) arranging the reference sample on a test support of a magnetic force microscope to be calibrated, so as to introduce at least one group of substructures selected for the reference sample into a test range of a magnetic probe;

(2) aiding a test system of the magnetic force microscope, obtaining magnetic phase image data of the at least one group of substructures at a specified probe-sample distance; and (3) evaluating image data obtained above and storing an evaluation result in a retrievable manner, so as to obtain a transfer function of a magnetic probe tip within a specific frequency range.

10. A calibration method of a magnetic probe tip by constructing a wide space frequency domain comprises the steps of:

(1) arranging the reference sample according to claim 1 on a test support of a magnetic force microscope to be calibrated, so as to introduce at least one group of substructures selected for the reference sample into a test range of a magnetic probe;

(2) obtaining magnetic phase image data of the at least one group of substructures at a specified probe-sample distance within 30 nm–100 nm;

(3) evaluating image data obtained above and storing an evaluation result as a first evaluation result;

(4) introducing other one group of substructures selected for the reference sample into a test range of a magnetic probe, then repeating steps (2)-(3) and storing an evaluation result as a subsequent evaluation result; and (5) performing data fusion on all the evaluation results to obtain a transfer function of the magnetic probe tip covering a wide space frequency domain, then fulfilling calibration to the magnetic probe tip.

\* \* \* \* \*